(12) United States Patent
Stark et al.

(10) Patent No.: US 6,956,215 B2
(45) Date of Patent: Oct. 18, 2005

(54) METHOD OF LOCALIZING A SCINTILLATION EVENT IN A SCINTILLATION CAMERA

(75) Inventors: Iain Stark, Manotick (CA); Henry Seywerd, Ottawa (CA); Michel Therrien, Ottawa (CA)

(73) Assignee: IS2 Medical Systems Inc., Nepean (CA)

( * ) Notice: Subject to any disclaimer, the term of this patent is extended or adjusted under 35 U.S.C. 154(b) by 203 days.

(21) Appl. No.: 10/373,287

(22) Filed: Feb. 24, 2003

(65) Prior Publication Data

US 2004/0056203 A1 Mar. 25, 2004

(30) Foreign Application Priority Data

Sep. 20, 2002 (CA) .............................................. 2404613

(51) Int. Cl.⁷ .................................................. G01T 1/64
(52) U.S. Cl. ....................................... 250/369; 250/366
(58) Field of Search ................................. 250/369, 366, 250/363.02, 363.03, 363.07, 363.09, 370.1, 370.11, 363.04, 336.1

(56) References Cited

U.S. PATENT DOCUMENTS

| | | | | |
|---|---|---|---|---|
| 4,172,226 A | * | 10/1979 | Rubin | 250/394 |
| 4,969,095 A | * | 11/1990 | Pauzat et al. | 250/363.02 |
| 5,319,204 A | * | 6/1994 | Wong | 250/363.03 |
| 5,608,221 A | * | 3/1997 | Bertelsen et al. | 250/363.03 |
| 5,753,917 A | * | 5/1998 | Engdahl | 250/367 |
| 5,841,141 A | * | 11/1998 | Gullberg et al. | 250/363.04 |
| 6,603,125 B1 | * | 8/2003 | Cooke et al. | 250/369 |
| 6,723,993 B2 | * | 4/2004 | Cooke et al. | 250/369 |
| 6,791,080 B2 | * | 9/2004 | Doroshenko et al. | 250/288 |

* cited by examiner

*Primary Examiner*—Otilia Gabor
(74) *Attorney, Agent, or Firm*—Pearne & Gordon LLP

(57) ABSTRACT

A method of localizing a scintillation event in a scintillation camera is disclosed. The method comprises steps of (a) assuming an ideal situation where the photomultiplier tubes of the camera behave ideally according to an ideal position-intensity distribution curve and an ideal locus for each PM tube is determined from the ideal position-intensity distribution curve such that all of the ideal loci intersect at a single point, which corresponds to the position of a scintillation event; (b) establishing a position function representing the single point, the position function depending on the coordinates of the PM tubes and the radii of ideal loci; (c) when a scintillation event occurs, measuring outputs of the PM tubes; (d) determining radii of real loci for the PM tubes by using the outputs of the PM tubes and real position-intensity distribution curves; and (e) substituting into the position function the coordinates of the PM tubes, and the radii of the real loci for the radii of the ideal loci in order to estimate the position of the scintillation event.

25 Claims, 5 Drawing Sheets

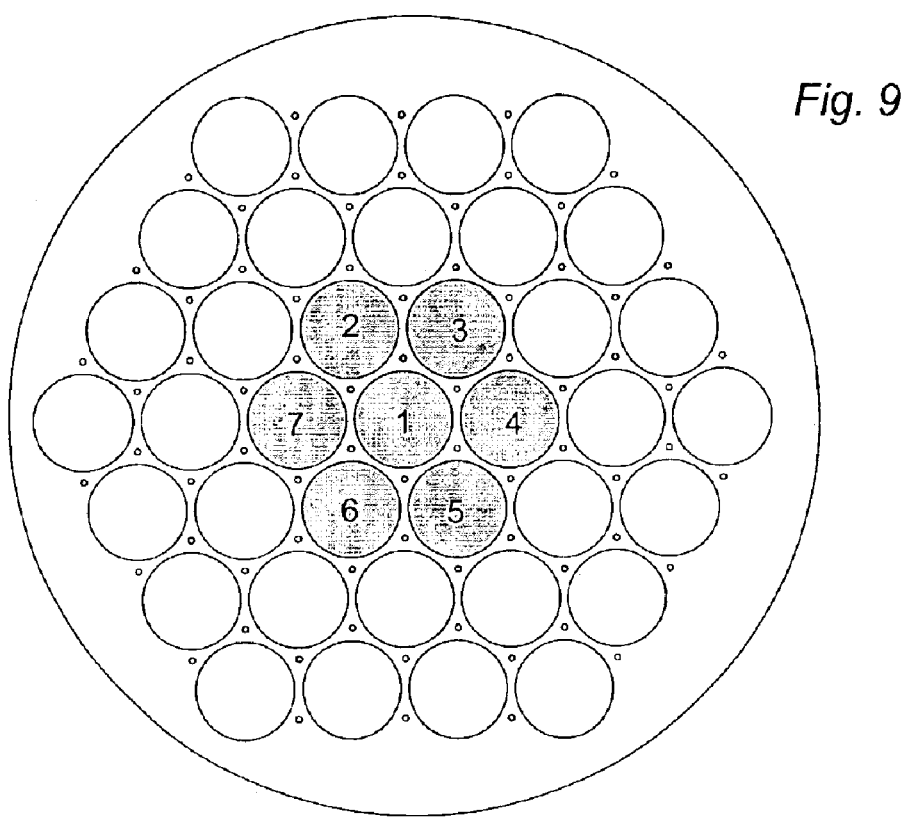
Fig. 9
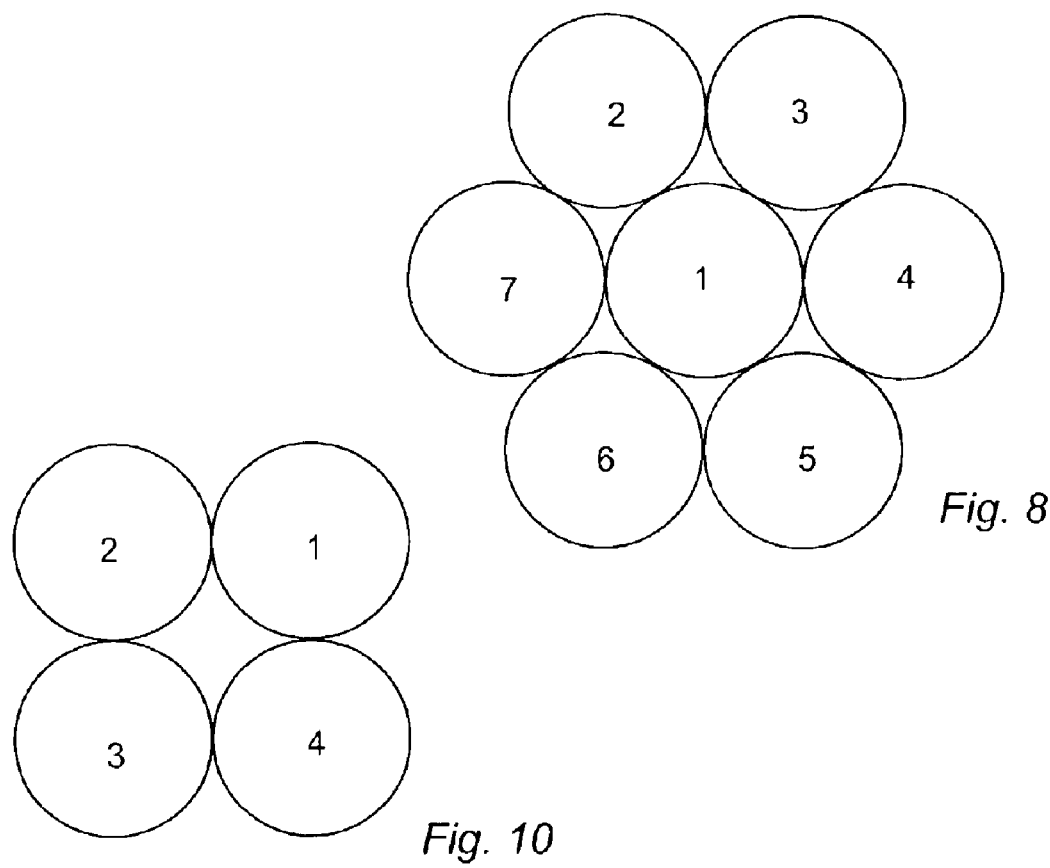
Fig. 8
Fig. 10

METHOD OF LOCALIZING A SCINTILLATION EVENT IN A SCINTILLATION CAMERA

FIELD OF THE INVENTION

The invention relates generally to scintillation cameras, and more particularly to a method for localizing a scintillation event in a scintillation camera.

BACKGROUND OF THE INVENTION

A common type of scintillation camera is schematically shown in FIG. 1. A lesion 15a of a patient body 15 containing a radioactive pharmaceutical emits gamma rays 16. The camera includes a collimator 13 so that only gamma rays within a predetermined narrow angle from the lesion 15a can pass through the collimator 13 to a scintillation crystal 11. A single gamma ray 16 entering the scintillation crystal 11 causes a scintillation event 17, where scintillation light 18 radiates outwards through a glass light guide 12 to an array of photomultiplier tubes (PM tubes) 10. The PM tubes 10 can be arranged in a rectangular or hexagonal grid. When a scintillation event occurs, each PM tube detects the scintillation light 18 and produces electrical signals, whose intensity is related to the amount of light received and which is transmitted to a signal processing unit 14. The unit 14 analyses all the signals received from the individual PM tubes in order to determine the position of the scintillation event 17, i.e., where each gamma ray 16 impinges on the scintillation crystal 11.

Several different algorithms have been used to calculate the incident location of the gamma-ray, i.e., the scintillation event position as discussed above. One commonly used algorithm is the centroid algorithm. The first step of the centroid algorithm is to calculate the centroid, or the intensity weighted averaged position of the scintillation event. This is calculated by summing the product of the position of each PM tube and its energy response to an event, and dividing this sum by the sum of the intensities of each PM tube.

The centroid algorithm is affected by the non-linearity of the relationship of amount of light received at a particular distance from the scintillation event, and the position and consequently the resulting image is highly distorted. This centroid calculation is very approximate, and results in events being weighted toward the centre of the PM tube under which the event happened. As such, it is not clinically useful without further corrections. However, the correction involves a complex procedure to make a correction table. Further, there remain residual distortions in the image even after corrections are applied.

Likelihood methods have also been used in the past. In general, likelihood methods require iterative calculations, which are computationally intensive, and so not practical for use in a real-time situation. Specifically, with this algorithm, a position is first guessed, then, through rigorous iteration, it is made better, at each step of computing the probability (likelihood) of the event to have taken place at that position, considering the individual PM tube outputs. This gives rise to very good spatial and energy resolution, but at the expense of an unbearably slow processing pace. For example, the maximum likelihood algorithm processes less than 100 events a second, due to the complexity of the computations (involving squares and logarithms), and to the iterative nature of the algorithm.

Another difficulty with conventional algorithms is that even larger distortions occur when an event occurs closer to the edge of the camera than in other regions, which means that these events cannot be used in analysis. Effectively, this results in inefficient use of the crystal surface. In some cases, 20% or more surface area around the edge of the camera is wasted space. The useable 80% or less may not be sufficient to obtain required views. As well, patient comfort is compromised when the camera cannot easily be positioned as required.

Therefore, there is a need to provide a new positioning algorithm, which can reduce the quantity of data processed by the camera electronics, retain the speed for practical use in real time, more effectively use the crystal surface, and reduce the need for corrections producing a higher quality image and better patient diagnoses.

SUMMARY OF THE INVENTION

According to one aspect of the present invention, there is provided a method of localizing a scintillation event in a scintillation camera having a plurality of photomultiplier (PM) tubes and a scintillation crystal, each PM tube having a position-intensity distribution curve which relates an output of a PM tube to a distance from the centre thereof to a scintillation event. The method comprises steps of: (a) assuming an ideal situation where, with respect to a scintillation event, each of the PM tubes behaves ideally according to an ideal position-intensity distribution curve and an ideal locus for each of the PM tube is determined from the ideal position-intensity distribution curve such that all of the ideal loci intersect at a single point, which corresponds to the position of the scintillation event; (b) establishing a position function representing the single point, the position function depending on the coordinates of the PM tubes and the radii of the ideal loci; (c) when a scintillation event occurs, measuring outputs of the PM tubes in response to the scintillation event; (d) determining radii of real loci for the PM tubes by using the outputs of the PM tubes and the position-intensity distribution curves; and (e) estimating the position of the scintillation event by substituting into the position function the coordinates of the PM tubes, and the radii of the real loci for the radii of the ideal loci.

According to another aspect of the present invention, there is provided a method of localizing a scintillation event in a scintillation camera having a plurality of photomultiplier (PM) tubes and a scintillation crystal, each PM tube having a position-intensity distribution curve which relates an output of a PM tube to a distance from the centre thereof to a scintillation event. The method comprises steps of: (a) assuming an ideal situation where, with respect to a scintillation event, each of the PM tubes behaves ideally according to an ideal position-intensity distribution curve and an ideal locus for each PM tube is determined from the ideal position-intensity distribution curve such that all of the ideal loci intersect at a single point, which corresponds to the position of the scintillation event; (b) establishing a position function representing the single point, the position function depending on the coordinates of the PM tubes and the radii of the ideal loci; (c) selecting a plurality of groups of PM tubes, each group of PM tubes being able to be used in positioning a scintillation event when it occurs and including at least three PM tubes; (d) substituting the coordinates of each PM tube of each group into the position function in order to generate a group position function with respect to each group, each group position function depending on the radii of the ideal loci of the PM tubes included in each; respective group; (e) when a scintillation event occurs, measuring outputs of the PM tubes in response to the scintillation event; (f) selecting one of the group position functions according to the outputs of the PM tubes; (g) determining radii of real loci of the PM tubes included in the selected group position function by using the outputs of PM tubes and the position-intensity distribution curves; and (h) estimating the position of the scintillation event by substituting into the selected group position function the radii of real loci for the radii of the ideal loci.

According to another aspect of the invention, there is provided a method of localizing a scintillation event in a scintillation camera having a plurality of photomultiplier (PM) tubes and a scintillation crystal, each PM tube having a position-intensity distribution curve which relates an output of a PM tube to a distance from the centre thereof to a scintillation event. The method comprises steps of: (a) assuming an ideal situation where, with respect to a scintillation event, each of the PM tubes behaves ideally according to an ideal position-intensity distribution curve and an ideal locus for each PM tube is determined from the ideal position-intensity distribution curve such that all of the ideal loci intersect at a single point, which corresponds to the position of the scintillation event; (b) selecting a plurality of groups of PM tubes, each group of PM tubes being able to be used in positioning a scintillation event when it occurs and including at least three PM tubes; (c) establishing a group position function for each group, the group position function representing the single point and depending on the radii of the ideal loci of the PM tubes included in each respective group; (d) when a scintillation event occurs, measuring outputs of the PM tubes in response to the scintillation event; (e) selecting one of the group position functions according to the outputs of the PM tubes; (f) determining radii of real loci of the PM tubes involved in the selected group position function by using the outputs of PM tubes and the position-intensity distribution curves; and (g) estimating the position of the scintillation event by substituting into the selected group position function the radii of real loci for the radii of the ideal loci.

According to another aspect of the invention, there is provided a method of localizing a scintillation event in a scintillation camera having a plurality of photomultiplier (PM) tubes and a scintillation crystal. The method comprises steps of: (a) determining a plurality of angular-radial position-intensity distribution curves for each of the PM tube, each angular-radial position-intensity distribution curve being determined along radial positions at each respective angular orientation of the corresponding PM tube, each angular-radial position-intensity distribution curve relating an output of a PM tube to a radial distance from the centre thereof to a scintillation event; (b) assuming an ideal situation where, with respect to a scintillation event, each PM tube behaves ideally according to an ideal angular-radial position-intensity distribution curve and an ideal locus for each PM tube is determined from the ideal angular-radial position-intensity distribution curve such that all of the ideal loci intersect at a single point, which corresponds to the position of the scintillation event; (c) establishing a position function representing the single point, the position function depending on the coordinates of the PM tubes and the radii of the ideal loci; (d) when a scintillation event occurs, measuring outputs of the PM tubes in response to the scintillation event; (e) determining radii of real loci for the PM tubes by using the outputs of the PM tubes and one of the angular-radial position-intensity distribution curves for the respective PM tube; (f) estimating a preliminary position of the scintillation event by substituting into the position function the coordinates of the PM tubes, and the radii of the real loci for the radii of the ideal loci; (g) determining angular positions of the PM tubes relative to the position of the scintillation event by utilizing the preliminary position; (h) selecting one of the angular-radial position-intensity distribution curves for each of the PM tubes used in the step (f), each selected angular-radial position distribution curve being closest to the determined angular position for each respective PM tube; and (i) calculating a final position of the scintillation event by repeating the steps (e) and (f) using the outputs of the PM tubes and the selected angular-radial position-intensity distribution curves, whereby the final position is corrected for the angular dependency of the PM tubes.

According to another aspect of the invention, there is provided a method of localizing a scintillation event in a scintillation camera having a plurality of photomultiplier (PM) tubes and a scintillation crystal. The method comprises steps of: (a) determining a plurality of angular-radial position-intensity distribution curves for each of the PM tubes, each angular-radial position-intensity distribution curve being determined along radial positions at each respective angular orientation of the corresponding PM tube, each angular-radial position-intensity distribution curve relating an output of a PM tube to a radial distance from the centre thereof to a scintillation event; (b) assuming an ideal situation where, with respect to a scintillation event, each of the PM tubes behaves ideally according to an ideal angular-radial position-intensity distribution curve and an ideal locus for each PM tube is determined from the ideal angular-radial position-intensity distribution curve such that all of the ideal loci intersect at a single point, which corresponds to the position of the scintillation event; (c) selecting a plurality of groups of PM tubes, each group of PM tubes being able to be used in positioning a scintillation event when it occurs and including at least three PM tubes; (d) establishing a group position function for each group, the group position function representing the single point and depending on the radii of the ideal loci of the PM tubes included in each respective group; (e) when a scintillation event occurs, measuring output of the PM tubes in response to the scintillation event; (f) selecting one of the group position functions according to the outputs of the PM tubes; (g) determining radii of real loci of the PM tubes involved in the selected group position function by using the outputs of the PM tubes and one of the angular-radial position-intensity distribution curves for each respective PM tube; (h) estimating a preliminary position of the scintillation event by substituting into the selected group position function the radii of real loci for the radii of the ideal loci; (i) determining angular positions of the PM tubes relative to the position of the scintillation event by utilizing the preliminary position; (j) selecting one of the angular-radial position-intensity distribution curves for each of the PM tubes involved in the selected group position function, each selected angular-radial position distribution curve being closest to the determined angular position for each respective PM tube; and (k) calculating a final position of the scintillation event by repeating the steps (g) and (h) using the outputs of the PM tubes, and the selected angular-radial position-intensity distribution curves, whereby the final position is corrected for the angular dependency of the PM tubes.

According to another aspect of the invention, there is provided a method of localizing a scintillation event in a scintillation camera having a plurality of photomultiplier (PM) tubes and a scintillation crystal. The method comprising steps of: (a) determining a plurality of angular-radial position-intensity distribution curves for each of the PM tubes, each angular-radial position-intensity distribution curve being determined along radial positions at each respective angular orientation of the corresponding PM tube, each angular-radial position-intensity distribution curve relating an output of a PM tube to a radial distance from the centre thereof to a scintillation event; (b) when a scintillation event occurs, estimating a primary position of the scintillation event by using one of the plurality of angular-radial position-intensity distribution curves and outputs of the PM tubes in response to the scintillation event; (c) determining angular orientations of the PM tubes relative to the scintillation event by using the preliminary position; (d) selecting one of the angular-radial position-intensity distribution curves for the PM tubes, each selected angular-radial position distribution curve being closest to the determined angular orientation for each respective PM tube; (e) calculating a secondary position of the scintillation event by using the selected angular-radial position-intensity distribution curves and the outputs of the PM tubes, whereby the secondary position is corrected for the angular dependency of the PM tubes.

A further understanding of other aspects, features, and advantages of the present invention will be realized by reference to the following description, appended claims and accompanying drawings.

BRIEF DESCRIPTION OF THE DRAWINGS

The embodiment(s) of the present invention will be described with reference to the accompanying drawings, in which:

FIGS. 8 and 9 shows a hexagonal cluster of seven photomultiplier tubes to illustrate an embodiment of the invention; and FIG. 10 depicts a rectangular array of four photomultiplier tubes to illustrate another embodiment of the invention.

DETAILED DESCRIPTION OF THE PREFERRED EMBODIMENT(S)

Figure 1:
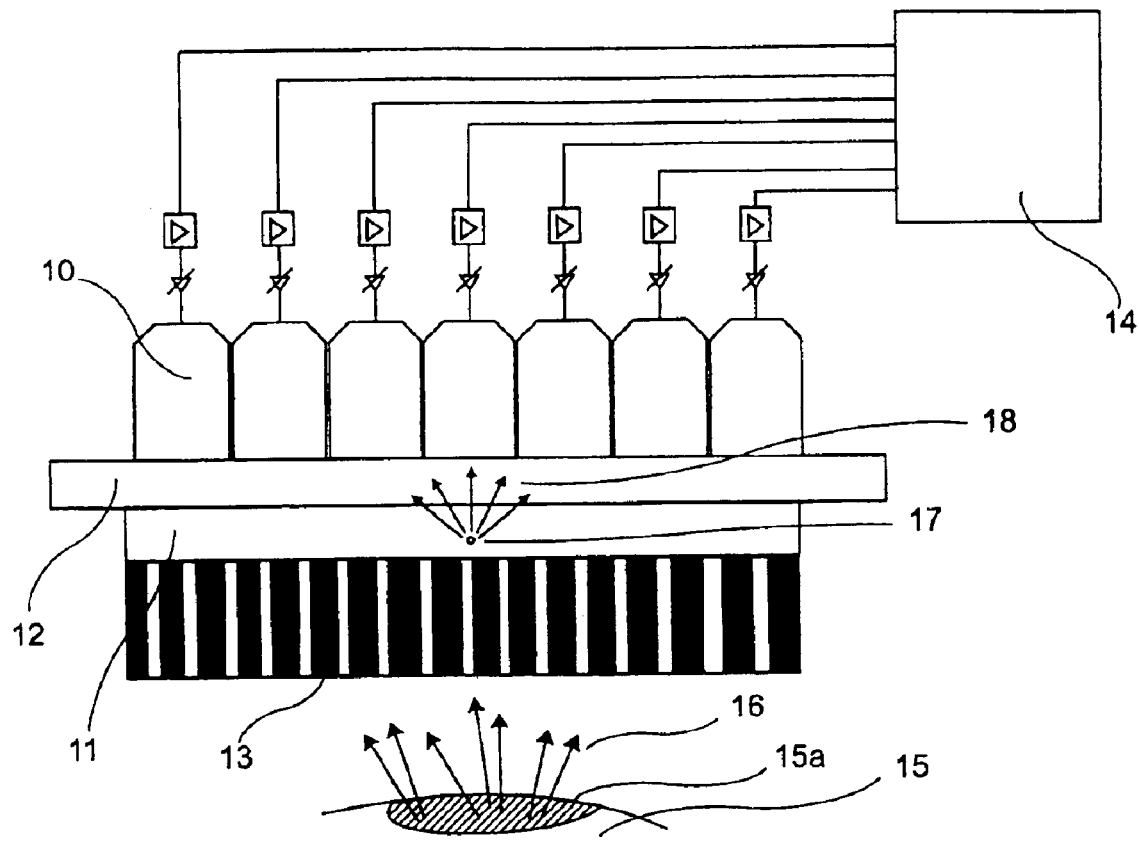
FIG. 1 shows a common type of scintillation camera.

FIG. 1 schematically depicts a common type of scintillation camera, to which the embodiments of the invention are principally applied, but not exclusively. Referring to FIG. 1, a scintillation event 17 occurs at a single point (indicated as at 17) in a scintillation crystal 11 due to an incoming gamma ray 16 of a particular energy. From the event point 17, a light flash or scintillation 18 radiates. Since the light 18 travels in many directions, the light is generally detected by more than one photomultiplier (PM) tube 10, which generates electrical signals (outputs) whose intensities depend on the distance of the center of the PM tube from the impact point of the gamma ray, i.e., the position of the scintillation event 17. The PM tube closest to the scintillation event 17 receives the most light and generates the strongest output, i.e., the highest intensity of signal.

The position of the scintillation (light) event 17 is determined in a processing electronics or circuitry 14, where all signals coming from PM tubes 10 are analysed. The behaviour of a PM tube is characterized by a position-intensity distribution curve (sometimes known as a "roll-off curve), which establishes the relationship between the output of a PM tube (the intensity of a tube signal) and the distance of the position of a scintillation event from the tube center. The relationship of signal intensity with distance is monotonic but non-linear.

Figure 2:
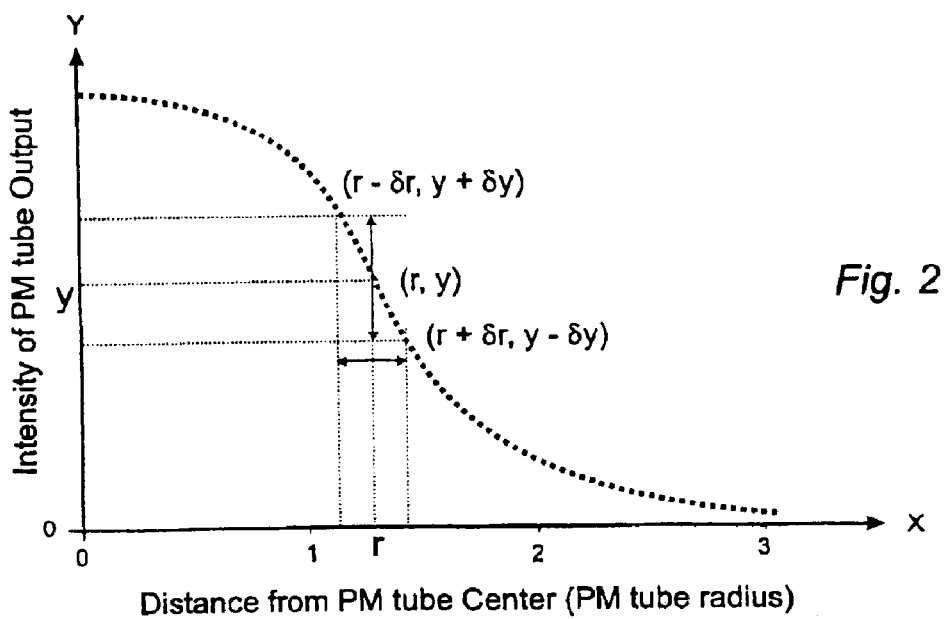
FIG. 2 illustrates a typical position-intensity distribution curve for a PM tube.

FIG. 2 shows a typical position-intensity distribution curve for a PM tube, which is basic to any positioning algorithm and establishes the relationship between the output of a PM tube (y-axis) and the distance from the tube center to a scintillation position (x-axis). Typically each PM tube has its own characteristic roll-off position-intensity distribution curve, and various methods of constructing roll-off position-intensity distribution curves are well-known in the art. The most general form of a position-intensity distribution curve has both a radial and an angular dependence. FIG. 2 shows a typical PM tube output, in arbitrary units relative to the distance from the PM tube center in units of PM tube radius. The shape of position-intensity distribution curve varies from PM tube to tube, and is dependent on a number of factors, including the scintillation crystal, the surface treatment of the crystal, the thickness of the crystal and the PM tube itself. However, the general features of the curves are the same. As illustrated in FIG. 2, the signal intensity (output) falls off the distance in such a manner that the rate of fall-off varies with the distance, and tends to flatten out as the distance increases, for example, at around three PM tube radii. Therefore, when a scintillation event occurs, only a subset of PM tubes around the event point out of the total number of tubes is selected to be used in the positioning algorithms.

It is noted that the position-intensity distribution curve of FIG. 2 is a mean curve, that is, it shows what is the average output of the PM tube at each point along the x-axis. Therefore, any specific event may take a range of values around the mean. As depicted in FIG. 2, when a scintillation event occurs at a distance r from a PM tube center, the output of the PM tube will be between y-δy and y+δy, where δy is an error estimate. Similarly, if an output of a PM tube is y, the possible position of the event will be in between the circles of radius r-δr and r+δr, where δr is another error estimate. The size of δy depends on the probability distribution describing the error, while δr depends on δy and on the slope at the point r. The value of δy is related to the value of y since the statistical variation of y goes as the square root of y, and also varies with a number of factors in operating environment, such as the characteristics of each PM tube, their arrangement, and camera electronics, or the like. Further, there is no information to correct the random deviations (δy and/or δr) from the mean value. However, when a scintillation event occurs, every PM tube around the event point has its own probability distribution, for example, the Poission distribution, and its maximum probability will occur at its average value.

Figure 3:
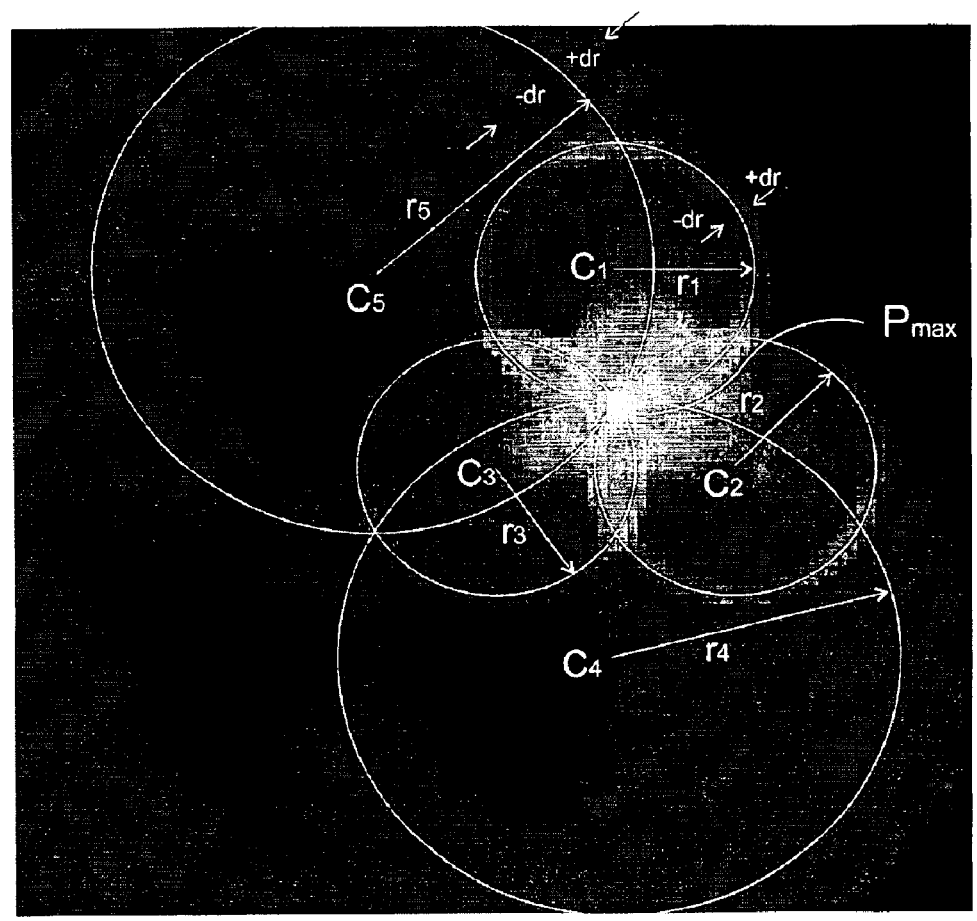
FIGS. 3 and 4 graphically show maximum probability circles and a maximum probability point with respect to a certain group of PM tubes.
Figure 4:
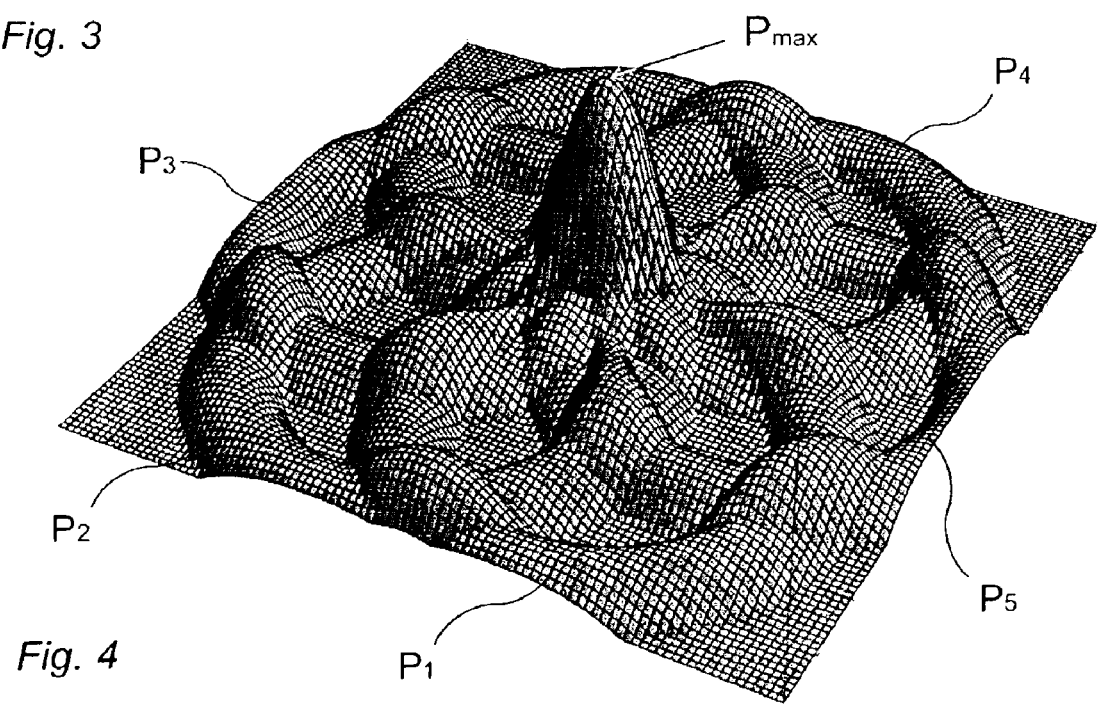

FIGS. 3 and 4 graphically depict the above discussion. In FIG. 3, it is assumed that, with respect to an arbitrary event, five PM tubes 1 to 5 are selected to estimate the event position although FIG. 3 involves seven PM tubes. The centers of the selected PM tubes are denoted by C1 to C5 respectively. Each PM tube has its own probability distribution as noted above. For example, with respect to the PM tube 1, the probability of having had the measured output is illustrated as a ring pattern (a gray-tone ring), where the maximum probability occurs at its center circle (a while circle) of radius r1, which is hereinafter called a "maximum probability circle" for the convenience of description. The maximum probability circle can correspond to the average output of its measured position-intensity distribution curve. Similarly, other PM tubes 2 to 5 will have their own probability distribution rings and their respective maximum probability circle which is shown as white circles of radius r2, r3, r4 and r5 respectively in FIG. 3. Therefore, summing the probability distributions of all selected PM tubes will provide a point of maximum value ($P_{max}$ in FIG. 3), where the arbitrary scintillation event would have occurred, and where all the maximum probability circles will intersect if all the selected PM tubes have behaved ideally.

FIG. 4 shows more graphical interpretation of each probability distribution and a maximum probability point when they are summed. In FIG. 4, each toroid or donut (P1 to P5) is a measured probability distribution for each PM tube, where the height at every point corresponds to the probability of having had the measured output value. Further, every peak point of a toroid will lie on its maximum probability circle as discussed above in conjunction with FIG. 3. Therefore, the summation of all the toroids (all the probability distribution) provides a maximum point $P_{max}$, which is the most probable event point, and where all the maximum probability circles will intersect with a maximum possibility. Consequently, this maximum probability point can be defined as the real position of a scintillation event. In real life, however, the probability of having a single intersecting point in any one single event is very small. In a real system, every PM tube acts in an independent and different way, and statistical fluctuation and measurement errors will lead to deviations from an exact intersection point. The treatment of these deviations is discussed hereinafter in greater detail.

According to one embodiment of the present invention, it is, at first, assumed that all the PM tubes of a scintillation camera behave ideally with maximum probability as discussed above, i.e., the entire camera system behaves in such a manner that it produces a single intersection point in response to any scintillation event. This embodiment of the invention comes from a geometrical interpretation of this assumed situation when a scintillation event has occurred. In other words, maximum probability circles of the probability distributions of a selected group of PM tubes will be intersected at a single point, which corresponds to the real event position under the ideal circumstance as assumed above. Throughout the description, the above assumption will also be described as an "ideal situation," "ideal circumstance," or "ideal operation." A geometrical interpretation for the ideal situation and calculation of the event position will be explained below in detail.

Figure 5:
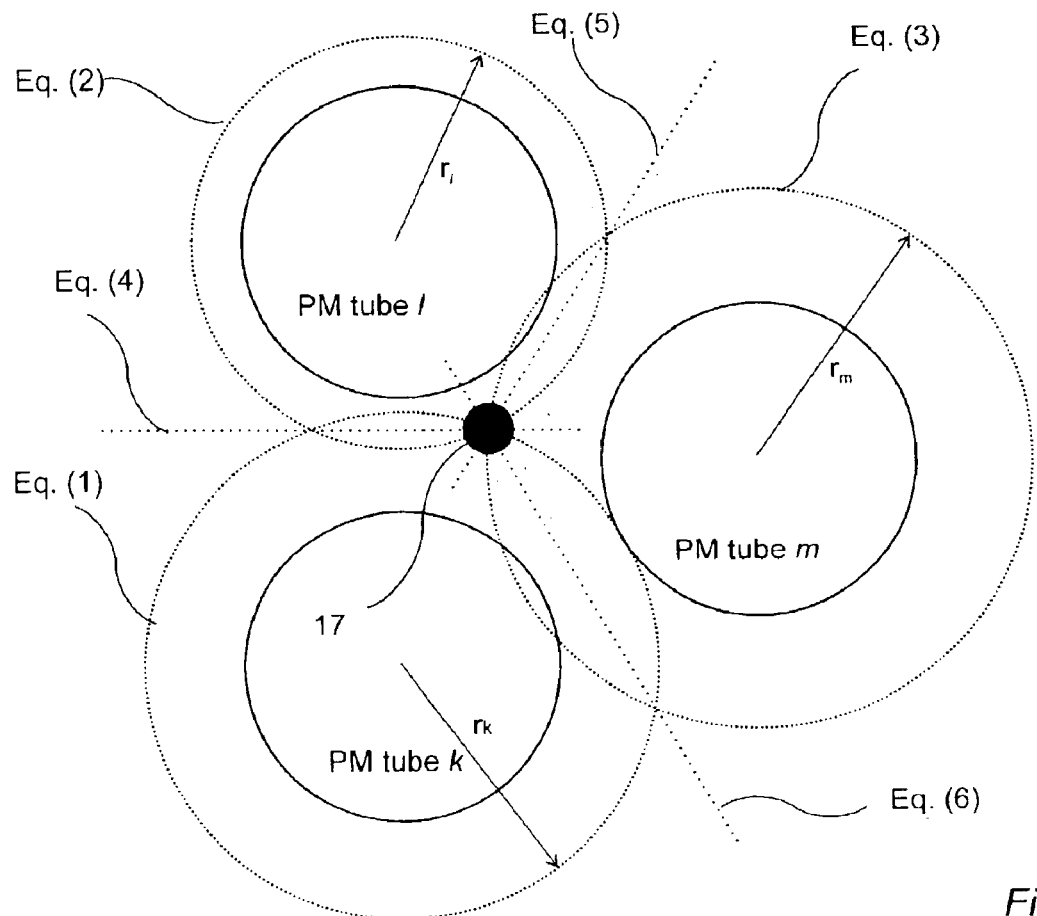
FIGS. 5 to 7 schematically illustrate an ideal situation of positioning gamma events in accordance with an assumption of an embodiment of the invention.

FIG. 5 schematically illustrates the ideal situation as noted above in accordance with an embodiment of the invention. As is shown in FIG. 5, it is assumed that a scintillation event has occurred at a point 17, and three PM tubes k, l and m around the event are selected to be used in positioning the event point 17. It is be also assumed that the coordinates of the three PM tube are $(x_k, y_k)$, $(x_l, y_l)$, and $(x_m, y_m)$ respectively, and the outputs (signal intensities) in response to the event are $l_k$, $l_l$ and $l_m$ respectively. For each PM tube, an event distance r from the tube centre can be determined from a position-intensity distribution curve, which is assumed to be the same for all PM tubes, and then, a maximum probability circle having a radius r can be established for each PM tube. The maximum probability circle will be hereafter referred to as an "ideal locus."

Figure 6:
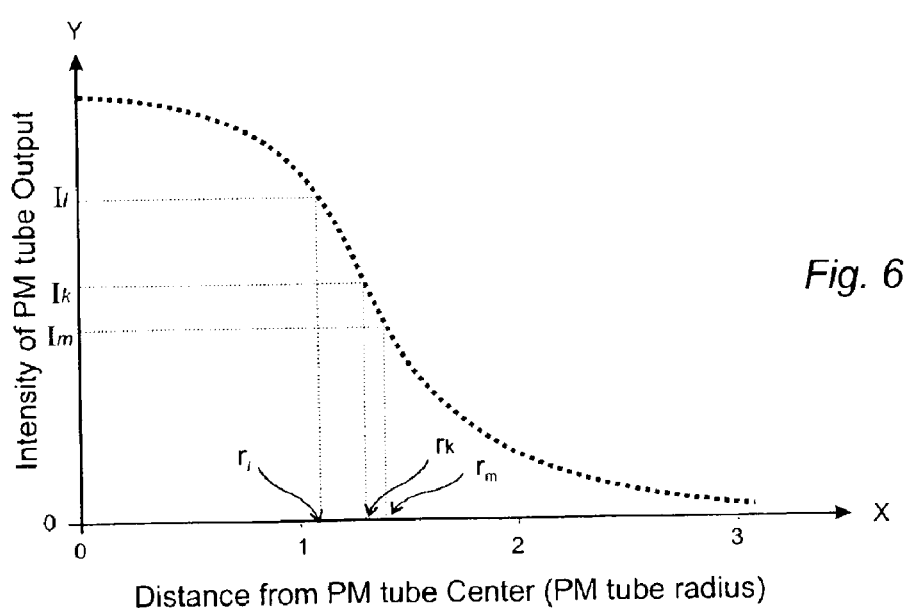

More specifically, assuming that the position-intensity distribution curves for the PM tubes k, l and m are the same, the distance of the event can be determined as $r_k$, $r_l$, and $r_m$ for the tube k, l and m respectively, as is shown in FIG. 6. Therefore, as depicted in FIG. 5, three ideal loci can be established, each of which has a radius $r_k$, $r_l$, and $r_m$ respectively. The equations for the three ideal loci are given as follows:

$$(x-x_k)^2+(y-y_k)^2=r_k^2 \tag{1}$$

$$(x-x_l)^2+(y-y_l)^2=r_l^2 \tag{2}$$

$$(x-x_m)^2+(y-y_m)^2=r_m^2 \tag{3}$$

where (x,y) represents points on their respective ideal locus. The intersection point of three ideal loci will be the event position, which is a real one, i.e., the real event position, under the ideal situation.

Then, for the purpose of calculating the common intersection point 17, a line equation passing intersection point(s) of each combinational pair of the three ideal loci can be determined as follows:

$$x(x_l - x_k) + y(y_l - y_k) = \frac{1}{2}\{r_k^2 - r_l^2 - x_k^2 - y_k^2 + x_l^2 + y_l^2\} \tag{4}$$

$$x(x_m - x_l) + y(y_m - y_l) = \frac{1}{2}\{r_l^2 - r_m^2 - x_l^2 - y_l^2 + x_m^2 + y_m^2\} \tag{5}$$

$$x(x_k - x_m) + y(y_k - y_m) = \frac{1}{2}\{r_m^2 - r_k^2 - x_m^2 - y_m^2 + x_k^2 + y_k^2\} \tag{6}$$

As is illustrated in FIG. 5, the location of the scintillation event 17, i.e., the single intersection point, is determined by solving the line equations (4), (5) and (6).

Figure 7:
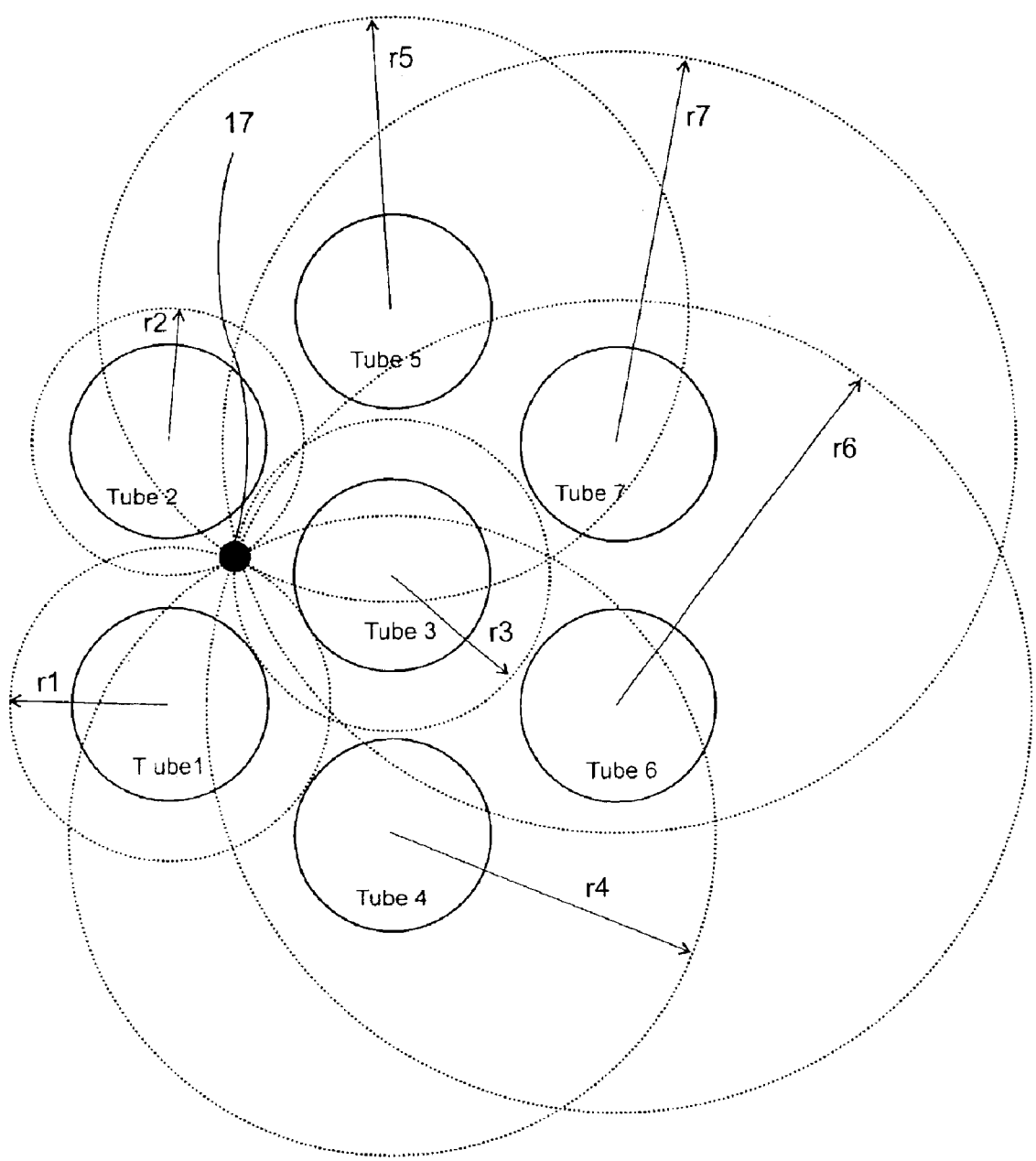

As is exemplified in FIG. 7, expansion and generalization of the above equation (4), (5) and (6) with respect to more than three PM tubes results in the following matrix equation, where the (k, l) indices are distinguished from those in the equations (4), (5) and (6):

$$\left(\sum_{k=1}^{n-1}\sum_{l=k+1}^{n} x_l - x_k \quad \sum_{k=1}^{n-1}\sum_{l=k+1}^{n} y_l - y_k\right)\binom{x}{y} = \tag{7}$$

$$\frac{1}{2}\left(\sum_{k=1}^{n-1}\sum_{l=k+1}^{n} r_k^2 - r_l^2 - x_k^2 - y_k^2 + x_l^2 + y_l^2\right)$$

Inserting multiplicative terms $(x_l-x_k)$ and $(y_l-y_k)$, and rewriting gives:

$$\binom{x}{y}\begin{pmatrix} \sum_{k=1}^{n-1}\sum_{l=k+1}^{n}(x_l-x_k)^2 & \sum_{k=1}^{n-1}\sum_{l=k+1}^{n}(y_l-y_k)(x_l-x_k) \\ \sum_{k=1}^{n-1}\sum_{l=k+1}^{n}(y_l-y_k)(x_l-x_k) & \sum_{k=1}^{n-1}\sum_{l=k+1}^{n}(y_l-y_k)^2 \end{pmatrix} = \tag{8}$$

$$\frac{1}{2}\begin{pmatrix} \sum_{k=1}^{n-1}\sum_{l=k+1}^{n}(x_l-x_k)(r_k^2-r_l^2-x_k^2-y_k^2+x_l^2+y_l^2) \\ \sum_{k=1}^{n-1}\sum_{l=k+1}^{n}(y_l-y_k)(r_k^2-r_l^2-x_k^2-y_k^2+x_l^2+y_l^2) \end{pmatrix},$$

which can be solved for x and y as below:

$$\begin{pmatrix} x \\ y \end{pmatrix} = \frac{1}{2} \begin{pmatrix} \sum_{k=1}^{n-1} \sum_{l=k+1}^{n} (x_l - x_k)^2 & \sum_{k=1}^{n-1} \sum_{l=k+1}^{n} (y_l - y_k)(x_l - x_k) \\ \sum_{k=1}^{n-1} \sum_{l=k+1}^{n} (y_l - y_k)(x_l - x_k) & \sum_{k=1}^{n-1} \sum_{l=k+1}^{n} (y_l - y_k)^2 \end{pmatrix}^{-1} \quad (9)$$

$$\begin{pmatrix} \sum_{k=1}^{n-1} \sum_{l=k+1}^{n} (x_l - x_k)(r_k^2 - r_l^2 - x_k^2 - y_k^2 + x_l^2 + y_l^2) \\ \sum_{k=1}^{n-1} \sum_{l=k+1}^{n} (y_l - y_k)(r_k^2 - r_l^2 - x_k^2 - y_k^2 + x_l^2 + y_l^2) \end{pmatrix}$$

The above equation (9) includes complicated double sums. Even considering the terms involving the coordinates of PM tubes as pre-computable, it still requires a lot of computations.

Therefore, using double sum identities shown below, $$\sum_{k=1}^{n-1} \sum_{l=k+1}^{n} a_l b_l = \sum_{k=1}^{n} (k-1) a_k b_k$$

$$\sum_{k=1}^{n-1} \sum_{l=k+1}^{n} a_k b_k = \sum_{k=1}^{n} (n-k) a_k b_k$$

$$\sum_{k=1}^{n-1} \sum_{l=k+1}^{n} a_l b_k = \sum_{k=1}^{n-1} b_k \sum_{l=k+1}^{n} a_l = \sum_{k=2}^{n} a_k \sum_{l=1}^{k-1} b_l$$

$$\sum_{k=1}^{n-1} \sum_{l=k+1}^{n} (a_l - a_k)^2 = n \sum_{k=1}^{n} a_k^2 - \left( \sum_{k=1}^{n} a_k \right)^2$$

$$\sum_{k=1}^{n-1} \sum_{l=k+1}^{n} (a_l - a_k)(b_l - b_k) = n \sum_{k=1}^{n} a_k b_k - \sum_{k=1}^{n} a_k \sum_{l=1}^{n} b_l$$

$$\sum_{k=1}^{n-1} \sum_{l=k+1}^{n} (a_l b_k + a_k b_l) = \sum_{k=1}^{n} a_k \sum_{l=1}^{n} b_l - \sum_{k=1}^{n} a_k b_k$$

and introducing statistical formulae for mean M[ ], variance D[ ] and covariance K[ ], the equation (9) can be greatly simplified as follows:

$$x = (2n(D[x]D[y] - K^2[x, y]))^{-1} \sum_{k=1}^{n} (x_k^2 + y_k^2 - r_k^2)\{D[y](x_k - M[x]) - K[x, y](y_k - M[y])\} \quad (10)$$

$$y = (2n(D[x]D[y] - K^2[x, y]))^{-1} \sum_{k=1}^{n} (x_k^2 + y_k^2 - r_k^2)\{D[x](y_k - M[y]) - K[x, y](x_k - M[x])\} \quad (11)$$

where x and y values are the coordinates of the position of a scintillation event, and M[x], M[y], D[x], D[y], and K[x, y] are given as follows:

$$M[x] = \frac{1}{n} \sum_{k=1}^{n} x_i, \; M[y] = \frac{1}{n} \sum_{k=1}^{n} y_i \quad (12)$$

$$D[x] = \frac{1}{n} \sum_{k=1}^{n} (M[x] - x_i)^2, \; D[y] = \frac{1}{n} \sum_{k=1}^{n} (M[y] - y_i)^2 \quad (13)$$

-continued $$K[x, y] = \sum_{k=1}^{n} (M[x] - x_i)(M[y] - y_i) \quad (14)$$

In the above equations, the terms M[ ], D[ ] and K[ ] depend only on the coordinates of PM tubes, and therefore, can be pre-computed and stored in the processing computer of a camera, such that the positioning algorithm of this embodiment can be made faster in a real time situation. It should be noted that these forms are introduced for computational simplicity only and are not related to the probabilistic nature of the position-intensity curve distributions.

It is clearly understood that the above equations (10) to (14) can be applicable to any type of arrangement of PM tubes, as long as the coordinate of each PM tube and a position-intensity distribution curve for each tube are known. For example, the above equations (10) to (14) can be utilized in determining an event location by using either a hexagonal or rectangular array of PM tubes.

The equations (10) and (11) can be rewritten as follows:

$$x = P - Q \sum_{k=1}^{n} S_k r_k^2 \quad (15)$$

$$y = T - V \sum_{k=1}^{n} W_k r_k^2 \quad (16)$$

where P, Q, $S_k$, T, V and $W_k$ are given as follows:

$$P = (2n(D[x]D[y] - K^2[x, y]))^{-1} \quad (17)$$

$$\sum_{k=1}^{n} (x_k^2 + y_k^2)\{D[y](x_k - M[x]) - K[x, y](y_k - M[y])\}$$

$$Q = (2n(D[x]D[y] - K^2[x, y]))^{-1} \quad (18)$$

$$S_k = \{D[y](x_k - M[x]) - K[x, y](y_k - M[y])\} \quad (19)$$

$$T = (2n(D[x]D[y] - K^2[x, y]))^{-1} \quad (20)$$

-continued $$\sum_{k=1}^{n} (x_k^2 + y_k^2)\{D[x](y_k - M[y]) - K[x, y](x_k - M[x])\}$$

$$V = Q \quad (21)$$

$$W_k = \{D[x](y_k - M[y]) - K[x, y](x_k - M[x])\} \quad (22)$$

The above terms P, Q, $S_k$, T, V and $W_k$ are geometrical constants, i.e., depend only on the coordinates of the PM tubes regardless of the type of tube arrangement, for example, a hexagonal array or a rectangular array of tubes. Accordingly, each of those terms (17) to (22) can be pre-computed, for any group of at least three PM tubes. Therefore, the above solution (15) and (16) makes the positioning algorithm of this embodiment even faster in real time, compared to where the equations (10) to (11) are applied.

FIG. 9 shows a hexagonal array of PM tubes. For example, central seven PM tubes (1 to 7) can be selected for an arbitrary event, and the tubes are assumed closed packed as shown in FIG. 8. The coordinates of the tubes in this array are given as follows (in the unit of tube radius):

$$x=\{0,-1,1,2,1,-1,-2\}$$

$$y\sqrt{3}=\{0,1,1,0,-1,-1,0\}$$

Due to the symmetry of this situation, very simply solutions for M, D and K are obtained from the equations (12), (13) and (14) as follows:

$$M[x]=M[y]=0$$

$$D[x]=D[y]=12/7$$

$$K[x, y]=0$$

As noted above, these M, D and K value are fixed for the above specific group of PM tubes and thus can be pre-computed and stored in the camera system. By substituting these M, D and K values into the equations (10) and (11), the following simple solution can be obtained:

$$x = -\frac{1}{24}\sum_{k=1}^{n} r_k^2 x_k = -\frac{1}{24}(-r_2^2 + r_3^2 + 2r_4^2 + r_5^2 - r_6^2 - 2r_7^2) \quad (23)$$

$$y = -\frac{1}{24}\sum_{k=1}^{n} r_k^2 y_k = -\frac{\sqrt{3}}{24}(r_2^2 + r_3^2 - r_5^2 - r_6^2) \quad (24)$$

The above equations (23) and (24) depend on the coordinates of the selected seven PM tubes and the radii of the ideal loci associated with the tubes. The coordinates of the seven tubes are known, and consequently the equations (23) and (24) depend only upon the distances from each tube center to the event position. As previously discussed, the equations (23) and (24), i.e., the real event position (x, y) have been obtained under the ideal circumstance in accordance with the assumption of the embodiments of the invention. However, in any real system, the tubes behave in an independent and different way and have real position-intensity distribution curves different from the above ideal case. Also, the measured tube output are subject to statistical fluctuations and other source of errors, and therefore, the radii obtained from the real position-intensity distribution curves, i.e., the distances from the real event to the centre of each PM tube, deviate from the real value. Consequently, in contrast with the ideal loci, the real loci do not meet at a single point. If the radius as derived from the measured output is given by $r_i=R_i+\delta_i$ where $R_i$ is the radius of ideal locus and $\delta_i$ is the deviation from the ideal locus radius. This leads to perturbations from the real position of x and y to an estimated position of x' and y' as follows:

$$x' = -\frac{1}{24}\sum_{k=1}^{n} (r_k + \delta_k)^2 x_k \quad (25)$$

$$y' = -\frac{1}{24}\sum_{k=1}^{n} (r_k + \delta_k)^2 y_k \quad (26)$$

For random errors, for example, for those due to statistical fluctuations in PM tube output, the effect over a number of events does not introduce any bias in the real position. For each point in the image these random errors introduce a resolution loss at that position. This resolution loss can be recovered by accumulating more scintillation events in the image, and the effects of the $\delta_k$ terms will be reduced.

Similarly, every possible group of at least three PM tubes is selected and a position function like the equations (23) and (24) for each possible group can be generated and stored in a memory of the processing computer. Each position function will depend on the radii of ideal loci for the PM tubes belonging to the corresponding tube group. Then, when a scintillation event has occurs, an appropriate position function can be chosen by considering the tube outputs in response to the event, and the event position can be estimated fast in real time as in the above example. Due to this fast calculation or estimation of the event positions, a number of redundant events can be counted and, thus, statistical random errors of the camera system can be diminished such that the resultant image will be greatly improved.

Further, an example of three selected PM tubes will be described hereafter. In FIG. 8, tubes 1, 3 and 4 can be selected with respect to a scintillation event. Then, the coordinates of the tubes are (0, 0), (1, √3) and (2, 0) respectively. Using the equations (12) to (14), the terms of mean M[], variance D[], and covariance K[] can be calculated as follows: M[x]=1, M[y]=√3/3, D[x]=2/3, D[y]=2/3, and K[x, y]=0. As discussed above, these values depend on only the tube coordinates and thus, can be pre-computed and stored, for example, in look-up tables of the data processing computer of a camera.

The above pre-computed values are substituted into the equations (10) and (11), then the following solution, i.e., the event position is obtained.

$$x = 1 - \frac{3}{8}\left(\frac{-2}{3}r_1^2 + \frac{2}{3}r_3^2\right) \quad (27)$$

$$y = \frac{\sqrt{3}}{3} - \frac{\sqrt{3}}{2}(r_1^2 + 2r_2^2 - r_3^2) \quad (28)$$

Similarly, the equations (27) and (28) are fixed for the selected group of PM tubes and thus can be pre-calculated and stored in the computer of the camera. When a scintillation event occurs and the tubes 1, 3 and 4 are selected to estimate the position of the event, by using the outputs of the tubes 1, 3 and 4 and position-intensity distribution curves of the tubes, the values $r_1$, $r_3$, and $r_4$ of each tube can be determined and substituted into the stored equations (27) and (28), thereby locating the event position very quickly in real time.

Furthermore, an example of rectangular array of PM tube will be described below. FIG. 10 shows a selected group of four PM tubes from rectangular array tubes, which are assumed to be close-packed as shown. Assuming the origin to be the centre between all the PM tubes, the coordinates of the four tubes are as follows (in the unite of tube radius):

$$x=\{1,-1,-1,1,\}$$

$$y=\{1,1,-1,-1,\}$$

The values of the equations (12), (13) and (14) can be obtained as follows: M(x)=M(y)=0, D(x)=D(y)=1/4, and K(x, y)=0. Then, the position of the event, i.e., the equations (10) and (11) will be the following:

$$x = \frac{1}{2}(r_1^2 - r_2^2 + r_3^2 - r_4^2) \quad (29)$$

$$y = \frac{1}{2}(r_1^2 + r_2^2 - r_3^2 - r_4^2) \quad (30)$$

As previously described, these equations (29) and (30) or the M, D and K values can be pre-calculated and stored in, for example, a processing computer of the camera. Therefore, when a scintillation event occurs and the above tubes 1 to 4 are selected to estimate the event position, by using the equations the event position can be calculated very fast in real time in view of the simplicity of these equations.

Although the foregoing examples have been applied to the equations (10) to (14), the equations (15) to (22) can be utilized in the same manner. That is, the coordinates of a specific group of at least three PM tubes, regardless of the type of arrangement (hexagonal, rectangular, or other), can be substituted into the equations (17) to (22) to compute the values of P, Q, $S_k$, T, V and $W_k$. Then, by using these computed values, the equations (15) and (16) correspond to the selected tube group can be generated. Similarly, the P, Q, $S_k$, T, V and $W_k$ values, or the corresponding equations (15) and (16) can pre-computed and memorized in the memory of the processing computer. It should be noted that the pre-computations or any real-time calculations discussed above could be carried out in a computer, a microprocessor, or a dedicated processing circuit operatively associated with a scintillation camera and the calculated or computed results could be stored in a data storage such as a computer memory.

As previously discussed, the position-intensity distribution curve has a angular dependency, i.e., a photomultiplier tube has a different characteristic curve, depending on the angular position around the center of the PM tube due to the inherent asymmetry thereof. In another embodiment of the invention, an iterative approach is utilized, i.e., a first iteration ignoring angular dependency can be used to extract a preliminary position of a scintillation event. The preliminary position can then be used to determine an angular orientation of each PM tube relative to the event position and more accurate secondary event position can be extracted by using an angular-radial position-intensity distribution curve corresponding to the angular orientation as determined above for each PM tube.

More specifically, with respect of each PM tube, a plurality of angular-radial position-intensity distribution curves can be established about the center of the PM tubes. Each of the angular-radial position-intensity distribution curves is determined along radial positions at each respective angular orientation of the corresponding PM tube. For example, when a scintillation event occurs and tubes 1, 3 and 4 in FIG. 8 are selected to estimate the event position, first, radii $r_1$, $r_3$, and $r_4$ of the selected tubes 1, 3 and 4 can be determined using one of or an averaged curve of the angular-radial position-intensity distribution curves for each respective PM tube. These values $r_1$, $r_3$, and $r_4$ are substituted into the equations (27) and (28), thereby to estimate a preliminary event position very quickly in real time. Then, the preliminary event position can be utilized to determine the angular position for each selected PM tube relative to the scintillation event. Secondly, for each of the tube 1, 3, and 4, one of angular-radial position-intensity distribution curves, each of which is closest to the angular orientation of each tube relative to the scintillation event, can be chosen and utilized to calculated more precise radius value $r_1'$, $r_3'$, and $r_4'$. Similarly, these values $r_1'$, $r_3'$, and $r_4'$ are substituted into the equations (27) and (28) in order to provide more precisely estimated event position. Therefore, the event position calculated according to this embodiment is corrected for the angular dependency of the PM tubes.

While the present invention has been described with reference to several specific embodiments, the description is illustrative of the invention and is not to be construed as limiting the invention. Various modifications and variations may occur to those skilled in the art without departing from the scope of the invention as defined by the appended claims.

What is claimed is:

1. A method of localizing a scintillation event in a scintillation camera having a plurality o photomultiplier (PM) tubes and a scintillation crystal, each PM tube having a position-intensity distribution curve which relates an output of a PM tube to a distance from the centre thereof to a scintillation event, the method comprising steps of:

(1) preparing a position estimation, including:
  pre-establishing a position function representing a single most probable event point in which ideal loci of the PM tubes intersect with a maximum probability the ideal locus of a PMT tube representing a maximum probability circle, the ideal loci of the PM tubes being determined by an ideal position-intensity distribution curve, the position function being defined by a first variable term depending on the coordinates of the PM tubes and a second variable term depending on the radii of the ideal loci;

(2) estimating a position of a scintillation event, including:
  measuring outputs of the PM tubes in response to the scintillation event;
  determining radii of real loci for the PM tubes based on the outputs of the PM tubes and the position-intensity distribution curves; and
  calculating the single most probable event point by substituting the coordinates of the PM tubes for the first variable term, and the radii of said real loci for the second variable term, and outputting the calculated single most probable event point as the estimation of the position of the scintillation event.

2. A method according to claim 1, wherein the step of preparing a position estimation includes a step of:
  pre-calculating the first valuable term.

3. A method according to claim 1, further comprising a step of storing said position function into a data storage operatively associated with the scintillation camera.

4. A method according to claim 1, wherein the step of estimating a position of a scintillation event includes a step of selecting at least three PM tubes by considering the output of each PM tube after the measurement by the measuring step, and
  wherein the calculating step calculates the single most probable even point based on the selected PM tubes.

5. A method according to claim 4, wherein said at least three PM tubes have highest outputs.

6. A method according to claim 1, wherein the step of preparing a position estimation includes a step of selecting one or more groups of PM tubes, each group of PM tubes including at least three PM tubes, and
  wherein the pre-establishing step includes a step of establishing a group position function for each group of PM tubes, and wherein the calculating step calculates the single most probable event point based on one of the group position functions.

7. A method according to claim 6, wherein the second variable term of each said group position function depends on the radii of the ideal loci of the PM tubes in a respective group, and wherein the calculation step includes a step of substituting the radii of the real loci of the group for the second valuable term in the group position function to provide the position of the scintillation event.

8. A method according to claim 7, wherein the step of estimating a position of a scintillation event includes a step of selecting an estimation group having at east three PM tubes based on the output of each PM tube and one of the group position functions associated with the estimation group.

9. A method according to claim 8, wherein said at least three PM tubes have highest outputs.

10. A method according to claim 7, further comprising a step of storing said group position functions into a data storage operatively associated with the scintillation camera.

11. A method according to claim 6, further comprising a step of storing said group position functions into a data storage operatively associated with the scintillation camera.

12. A method according to claim 1, further comprising a step of determining a plurality of angular-radial position-intensity distribution curves for each PM tube, each angular-radial position-intensity distribution curve being determined along radial positions at each respective angular orientation of the corresponding PM tube, each angular-radial position-intensity distribution curve relating an output of a PM tube to a radial distance from the centre thereof to a scintillation event, and wherein the determining step utilizes one of said plurality of angular-radial position-intensity distribution curves for each PM tube, instead of the position-intensity distribution curve.

13. A method according to claim 12, wherein the step of estimating a position of a scintillation event includes the steps of:

determining angular positions of the PM tubes relative to the position of the scintillation event by utilizing the position estimated in the calculating step;

selecting one of the angular-radial position-intensity distribution curves for each PM tube used in the calculating step, each selected angular-radial position distribution curve being closest to the determined angular position for a respective PM tube; and calculating a final position of the scintillation event by repeating the determining step and the calculating step based on the outputs of the PM tubes and the selected angular-radial position-intensity distribution curves, whereby the final position is corrected for the angular dependency of the PM tubes.

14. A method according to claim 1, wherein the step of preparing a position estimation includes the steps of:

forming a plurality of groups of PM tubes, each group of PM tubes including at least three PM tubes, and substituting the coordinates of the PM tubes of each group for the first variable term to generate a group position function with respect to each group, each group position function being defined by the second variable term depending on the radii of the ideal loci of the PM tubes in a respective group; and wherein the step of estimating a position of a scintillation event includes the steps of:

based on the outputs of the PM tubes, selecting one of the groups and one of the group position function associated with the selected group to calculate the single most probable event point at the calculating step.

15. A method according to claim 1, wherein the step of preparing a position estimation includes the steps of:

forming a plurality of groups of PM tubes, each group of PM tubes including at least three PM tubes, and at the pre-establishing step, establishing a group position function for each group, each group position function representing the single most probable event point and being defined by a variable term depending on the radii of the ideal loci of the PM tubes in respective group;

wherein the step of estimating a position of a scintillation event includes the steps of:

based on the outputs of the PM tubes, selecting one of the groups and one of the group position functions associated with the selected group to calculate the single most probable event point at the calculating step.

16. A method according to claim 1, wherein the position function is expressed as:

$$x = (2n(D[x]D[y] - K^2[x, y]))^{-1} \sum_{k=1}^{n} (x_k^2 + y_k^2 - r_k^2)\{D[y](x_k - M[x]) - K[x, y](y_k - M[y])\}$$

$$y = (2n(D[x]D[y] - K^2[x, y]))^{-1} \sum_{k=1}^{n} (x_k^2 + y_k^2 - r_k^2)\{D[x](y_k - M[y]) - K[x, y](x_k - M[x])\}$$

$$M[x] = \frac{1}{n}\sum_{k=1}^{n} x_i, \ M[y] = \frac{1}{n}\sum_{k=1}^{n} y_i$$

$$D[x] = \frac{1}{n}\sum_{k=1}^{n} (M[x] - x_i)^2, \ D[y] = \frac{1}{n}\sum_{k=1}^{n} (M[y] - y_i)^2$$

$$K[x, y] = \sum_{k=1}^{n} (M[x] - x_i)(M[y] - y_i)$$

where $(x, y)$ is the coordinates of the single point, $(X_k, Y_k)$ is the coordinate of the PM tube, $r_k$ is a radius of the ideal loci, n is the index number of the PM tube.

17. A method according to claim 16, wherein the step of preparing a position estimation includes the step of:

pre-calculating $M[x]$, $D[x]$, $D[y]$, and $K[x, y]$.

18. A method according to claim 16, wherein the step of preparing a position estimation includes the steps of:

forming one or more groups of PM tubes, pre-calculating M[x], D[x], D[y], and K[x, y] for each group, and at the pre-establishing step, establishing a group position function for each group based on the pre-calculation result and the position function; and wherein the step of estimating a position of a scintillation event includes the step of:

based on the measurement results, selecting one of groups and one of group position functions associated with the selected group to calculate the single point at the calculation step.

19. A method of localizing a scintillation event in a scintillation camera having a plurality of photomultiplier (PM) tubes and a scintillation crystal, the method comprising step of:

(1) preparing a position estimation, including:

determining a plurality of angular-radial position-intensity distribution curves for each PM tube, each angular-radial position-intensity distribution curve being determined along radial positions at each respective angular orientation of the corresponding PM tube, each angular-radial position-intensity distribution curve relating an output of a PM tube to a radial distance from the centre thereof to a scintillation event;

pre-establishing a position function representing a single most probable event point in which ideal loci of the PM tubes intersect with a maximum probability, the ideal locus of a PM tube representing a maximum probability circle, the ideal locus of a PM tube being determined by an ideal angular-radial position-intensity distribution curve, the position function being defined by a first variable term depending on the coordinates of the PM tubes and a second variable term depending on the radii of the ideal loci;

(2) estimating a position of a scintillation event, including:

measuring outputs of the PM tubes in response to the scintillation event;

determining radii of real loci for the PM tubes based on the outputs of the PM tubes and one of angular-radial position-intensity distribution curves for the respective PM tube;

estimating a preliminary position of said scintillation event by substituting the coordinates of the PM tubes for the first variable term, and the radii of the real loci for the second variable term;

determining angular positions of the PM tubes relative to the position of the scintillation event by utilizing the preliminary position;

selecting one of the angular-radial position-intensity distribution curves for each of the PM tubes, each selected angular-radial position distribution curve being closest to the determined angular position for a respective PM tube; and calculating a final position of the scintillation event by repeating the determining step and the estimating step using the outputs of the PM tubes and the selected angular-radial position-intensity distribution curves, whereby the final position is corrected for the angular dependency of the PM tubes.

20. A method according to claim 19, wherein the step of preparing a position estimation includes a step of pre-calculating the first valuable term.

21. A method according to claim 19, further comprising a step of selecting at least three PM tubes based on the output of each PM tube after the measurement by the measuring step to calculate the final position of the scintillation event.

22. A method according to claim 21, wherein said at least three PM tubes have highest outputs.

23. A method according to claim 19, wherein the step of preparing a position estimation includes the steps of:

determining a plurality of angular-radial position-intensity distribution curves for each PM tube, each angular-radial position-intensity distribution curve being determined along radial positions at each respective angular orientation of the corresponding PM tube, each angular-radial position-intensity distribution curve relating an output of PM tube to a radial distance from the centre thereof to a scintillation event;

forming a plurality of groups of PM tubes, each group of PM tubes including at least three PM tubes; and at the pre-establishing step, establishing a group position function for each said group, each group position function representing the single most probable event point and being defined by a variable term depending on the radii of the ideal loci of the PM tubes in a respective group, the ideal locus of the PM tube being determined by the ideal angular-radial position-intensity distribution curve, wherein the step of estimating a position of a scintillation event includes the steps of:

based on the outputs of the PM tubes, selecting one of the groups and one of the group position functions associated with the selected group to estimate the primarily position and calculate the final position, determining radii of real loci of the PM tubes involved in said selected group position function by using said outputs of the PM tubes and one of said angular-radial position-intensity distribution curves for each respective PM tube.

24. A method according to claim 23, wherein in the determining step, the radii of real loci of the PM tubes are determined by using the outputs of the PM tubes and an averaged one of angular-radial position-intensity distribution curves for each respective PM tube.

25. A method according to claim 19, wherein in the preliminary position estimating step, the primary position of said scintillation event is estimated by using the outputs of said PM tubes and an averaged one of said angular-radial position-intensity distribution curves for each of the PM tubes.

* * * * *

UNITED STATES PATENT AND TRADEMARK OFFICE
CERTIFICATE OF CORRECTION

PATENT NO. : 6,956,215 B2 Page 1 of 1
APPLICATION NO. : 10/373287
DATED : October 15, 2005
INVENTOR(S) : Iain Stark et al.

It is certified that error appears in the above-identified patent and that said Letters Patent is hereby corrected as shown below:

Title page; On the face of the patent (54), underneath "Michel Therrien, Ottawa (CA)", please insert -- ;Patrick F. Olivier, Plantation (FL) --.

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,956,215 B2 | Page 1 of 1 |
| APPLICATION NO. | : 10/373287 | |
| DATED | : October 18, 2005 | |
| INVENTOR(S) | : Iain Stark et al. | |

It is certified that error appears in the above-identified patent and that said Letters Patent is hereby corrected as shown below:

Title page; On the face of the patent (54), underneath "Michel Therrien, Ottawa (CA)", please insert -- ;Patrick F. Olivier, Plantation (FL) --.

This certificate supersedes the Certificate of Correction issued December 25, 2007.

Signed and Sealed this

Twenty-ninth Day of January, 2008

JON W. DUDAS
*Director of the United States Patent and Trademark Office*